(12) United States Patent
Helmersson

(10) Patent No.: US 6,470,061 B1
(45) Date of Patent: *Oct. 22, 2002

(54) CONTROL ROD FOR NUCLEAR REACTOR

(75) Inventor: Sture Helmersson, Kolbäck (SE)

(73) Assignee: Westinghouse Atom AB, Vasteras (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 795 days.

(21) Appl. No.: 08/617,894

(22) PCT Filed: Sep. 19, 1994

(86) PCT No.: PCT/SE94/00869

§ 371 (c)(1),
(2), (4) Date: Mar. 19, 1996

(87) PCT Pub. No.: WO95/08828

PCT Pub. Date: Mar. 30, 1995

(30) Foreign Application Priority Data

Sep. 22, 1993 (SE) .............................. 9303107

(51) Int. Cl.$^7$ .............................. G21C 7/10
(52) U.S. Cl. .............................. 376/333; 376/327
(58) Field of Search .............................. 376/327, 333

(56) References Cited

U.S. PATENT DOCUMENTS 3,115,452 A * 12/1963 Rock .............................. 376/327
3,234,104 A * 2/1966 Gale et al. .............................. 376/327

(List continued on next page.)

FOREIGN PATENT DOCUMENTS

| JP | 0528292 | * | 1/1977 | 376/327 |
|----|---------|---|--------|---------|
| JP | 0014989 | * | 2/1981 | 376/327 |
| JP | 5791487 | * | 6/1982 | 376/333 |
| JP | 5796289 | * | 6/1982 | 376/333 |
| JP | 5814687 | * | 9/1983 | 376/333 |
| JP | 0035034 | * | 8/1985 | 376/327 |
| JP | 1011697 | * | 1/1986 | 376/327 |
| JP | 1180187 | * | 8/1986 | 376/327 |
| JP | 1180188 | * | 8/1986 | 376/333 |
| JP | 3169596 | * | 7/1988 | 376/333 |
| JP | 1088189 | * | 4/1989 | 376/327 |
| JP | 1114792 | * | 5/1989 | 376/327 |
| JP | 1148998 | * | 6/1989 | 376/327 |
| JP | 1158390 | * | 6/1989 | 376/327 |
| JP | 0034359 | * | 7/1989 | 376/327 |
| JP | 1304392 | * | 12/1989 | 376/327 |
| JP | 0128486 | * | 5/1991 | 376/327 |
| JP | 4048298 | * | 2/1992 | 376/327 |
| JP | 4128691 | * | 4/1992 | 376/327 |

OTHER PUBLICATIONS

ACNP–6106, Mar. 1, 1961, pp. 1–14, Potochnik.*

Primary Examiner—Harvey E. Behrend
(74) Attorney, Agent, or Firm—Connolly Bove Lodge & Hutz LLP; Larry J. Hume

(57) ABSTRACT

The invention relates to a control rod for a boiling water reactor. The control rod comprises a top piece and a bottom piece between which an absorber part is arranged. The absorber part comprises a central part (4) and four absorber blades (3) extending from the central part (4). The absorber part comprises a channel (10) which comprises the central part and which extends along the length of the whole absorber part. The channel is surrounded by walls of a neutron-absorbing material with a long service life, for example hafnium. The channel is at least partially filled with a moderator, for example light water. During the manufacture the absorber part has undergone a heat treatment such that the hafnium alloy has been completely or partially transformed from α-phase to β-phase and thereafter been rapidly cooled to α-phase.

8 Claims, 9 Drawing Sheets

U.S. PATENT DOCUMENTS

| | | | | |
|---|---|---|---|---|
| 3,309,118 A | * | 3/1967 | Anthony | 376/327 |
| 3,712,852 A | * | 1/1973 | Fisher | 376/333 |
| 3,781,191 A | * | 12/1973 | Jones | 376/327 |
| 4,400,347 A | * | 8/1983 | Fredin et al. | 376/327 |
| 4,587,093 A | * | 5/1986 | Borrman et al. | 376/444 |
| 4,631,165 A | * | 12/1986 | Wilson et al. | 376/333 |
| 4,655,999 A | * | 4/1987 | Maruyama et al. | 376/333 |
| 4,818,478 A | * | 4/1989 | Taleyarkhan | 376/435 |
| 4,876,060 A | * | 10/1989 | Yoshioka et al. | 376/333 |
| 5,034,185 A | * | 7/1991 | Ueda et al. | 376/333 |
| 5,164,153 A | * | 11/1992 | Fukumoto et al. | 376/333 |
| 5,276,718 A | * | 1/1994 | Ueda | 376/339 |

* cited by examiner

B - B

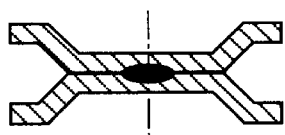
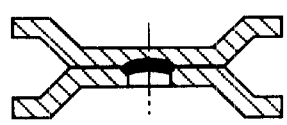
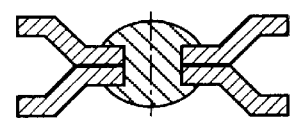
FIG. 5a    FIG. 5b    FIG. 5c
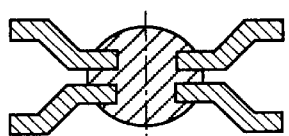
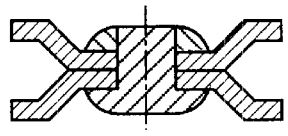
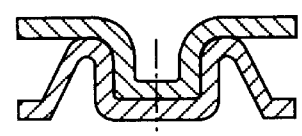
FIG. 5d    FIG. 5e    FIG. 5f

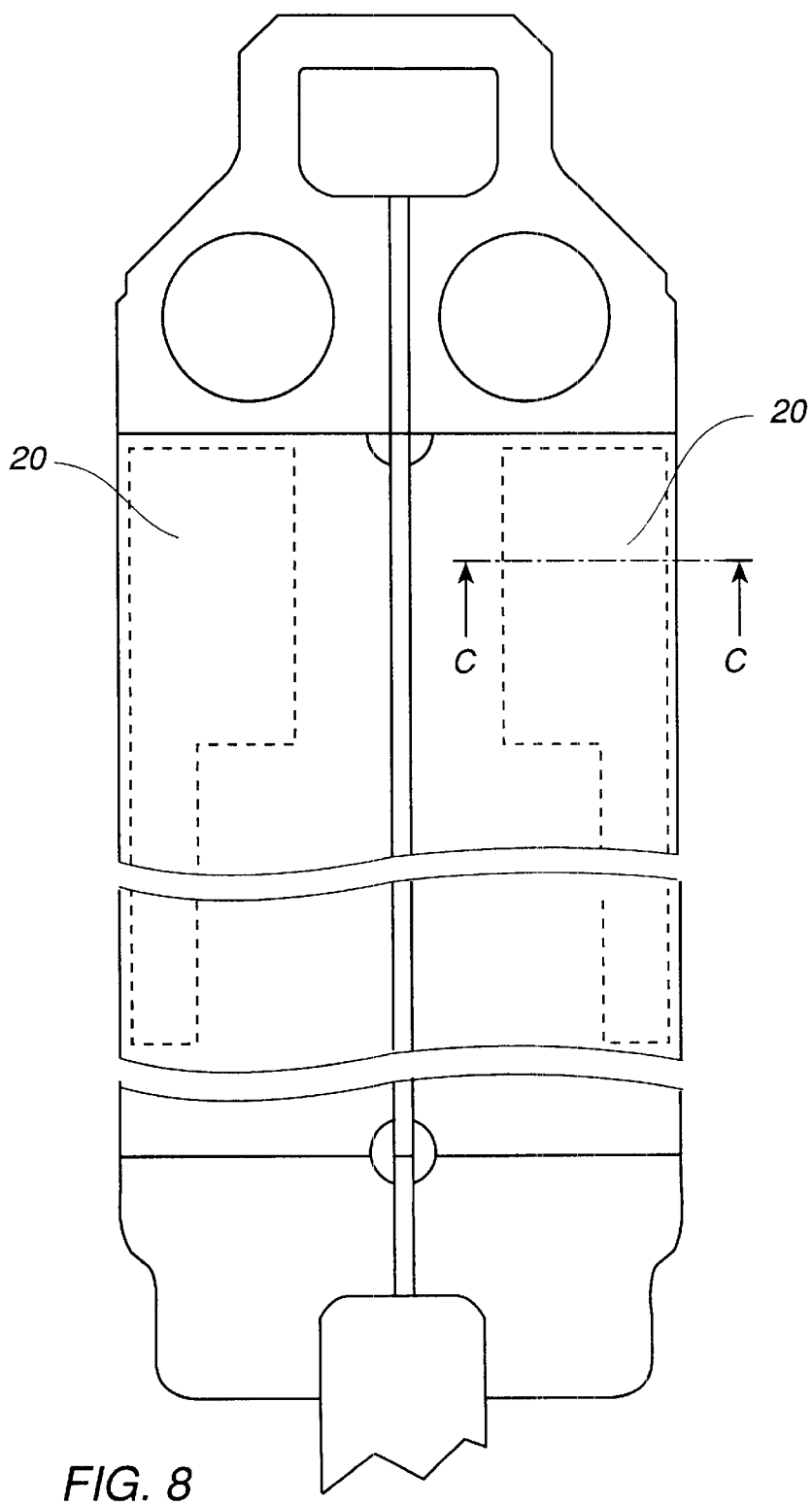

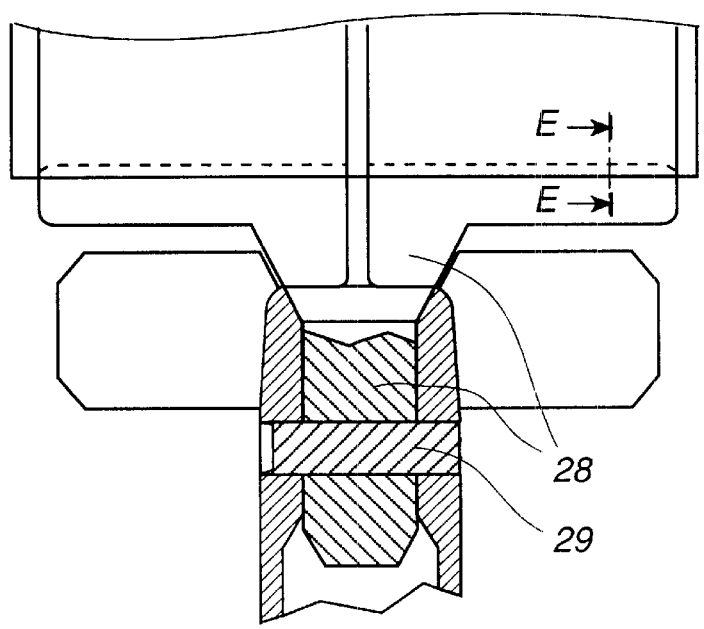
E-E
FIG. 14b
FIG. 14a

CONTROL ROD FOR NUCLEAR REACTOR

TECHNICAL FIELD

The present invention relates to a control rod for a boiling water reactor (BWR). More particularly, it relates to a control rod of a neutron-absorbing material which encloses a moderating substance.

BACKGROUND OF THE INVENTION

A core in a nuclear reactor normally contains several hundred fuel assemblies. These are arranged vertically in the core and have an at least substantially square cross section. Each fuel assembly comprises a bundle of fuel rods which are surrounded by a fuel channel. The fuel channel is open at both ends allowing the coolant of the reactor to flow through the fuel assembly. The core is immersed into water which serves both as coolant and as neutron moderator.

The core also includes a large number of control rods, each of which comprises four vertically arranged absorber blades forming a right-angled cross. The fuel assemblies are normally arranged in a regular lattice. Each fuel assembly is included in two rows of fuel assemblies which are perpendicular to each other. The control rods are normally arranged with each one of their absorber blades between two fuel assemblies located in the same row such that each control rod together with four fuel assemblies, arranged around the blades of the control rod, forms one unit. By moving the control rods into and out of the core, the power distribution of the core can be controlled.

Conventional control rods for boiling water reactors are composed of four elongated absorber blades which are arranged in a cruciform. The absorber blades are generally of stainless which are steel and provided with a large number of bored holes or tubes filled with a powder of boron carbide ($B_4C$), acting as neutron absorber.

When a control rod is inserted into the core in the reactor, the neutron absorber is irradiated by neutrons and successively loses neutron absorption capacity. The control rod is therefore replaced after being used for a predetermined operating period. It is true that boron carbide has a great ability to absorb neutrons, but it has disadvantages. Since the boron carbide is in a powdered state, it must be encapsulated into the absorber blades. When the boron carbide absorbs neutrons, it swells, which causes great mechanical stresses on the cladding. Control rods with boron carbide as absorber material therefore have a relatively short service life.

A number of different proposals for new control rods with longer service lives have been produced, one example being disclosed in the patent specification U.S. Pat. No. 5,034,185. Common to these proposals is that the neutron absorber consists of a material with a comparatively long life, for example hafnium. A further advantage with hafnium, in relation to the boron carbide is its good corrosion properties, which means that hafnium withstands contact with the cooling water and need not be encapsulated. On the other hand, hafnium is not as good a neutron absorber as boron carbide, so in order to obtain an equally effective control rod the quantity of absorber material needs to be increased. One problem with hafnium is that it is expensive and has a high density, which entails an increase in both the weight and the cost of control rods manufactured of this material.

The probability that a neutron will be absorbed increases the lower its energy is. Thus, a fast neutron has a very small probability of being absorbed. In the patent specification U.S. Pat. No. 4,876,060 a control rod is described in which the absorber blades comprise absorber plates of hafnium, which are arranged such that a channel filled with water is formed between them. The water moderates (slows down) the neutrons which are so fast that they are not absorbed the first time they pass through the absorber plate. The fast neutrons are slowed down by collisions with the hydrogen atoms of the water and will be absorbed with a higher probability the next time they pass through one of the absorber plates. By using a moderator between the absorber plates, the absorption capacity of the control rod increases, which means that the absorber plates can be made thinner. In this way, the consumption of the expensive and heavy absorber material can be reduced. This technique is common knowledge and usually referred to as a neutron trap.

The control rod described above is composed of four absorber blades, which are arranged in a cruciform and fixed to a central supporting rod, a so-called center rod. The control rod also has an external shroud of, for example, stainless steel. The center rod consists of a rod whose length corresponds to the length of the absorber blades in the longitudinal direction of the control rod. A disadvantage of the control rod described above is that the volume of the moderator is limited by the centre rod and the shroud. With a different embodiment of the control rod, the volume of the moderator can be increased and the absorption capacity of the control rod be further improved.

It is an object of the invention to propose a control rod which has a high neutron absorption capacity, has a long service life, is simple and inexpensive to manufacture, does not weigh too much.

SUMMARY OF THE INVENTION

The invention relates to a control rod comprising a top piece and a bottom piece between which an absorber part is arranged. The absorber part comprises a central part and four absorber blades extending from the central part. The absorber part comprises a channel which comprises the central part and which extends along the length of the whole absorber part. The channel is surrounded by walls which comprise a neutron-absorbing material with a long service life, for example hafnium. The channel is at least partially filled with a moderator, for example light water.

By arranging a moderator also in the central part of the control rod, an increase of the total volume of the moderator and a large coherent moderator volume are obtained. A large coherent moderator volume slows down the neutrons more than a plurality of smaller moderator volumes. This is due to the fact that the neutrons are able to move a longer distance in the larger volume and can, therefore, be slowed down to a greater extent. This means a great improvement of the efficiency of the control rod compared with previous solutions where moderator water is only present in a number of individual channels in the absorber blades and where the center is occupied by a central rod.

The control rod is simple in construction and is therefore inexpensive to manufacture. The weight and cost of the control rod can be weighed against its service life and its efficiency and is determined in a flexible way by the thickness of the absorber plate.

The control rod becomes flexible in a direction perpendicular to the longitudinal direction of the control rod. This provides good properties from a seismic point of view, and the flexibility also prevents the control rod from being stuck in the core, because of bowed control rods or fuel assemblies or other similar reasons, when it is to be moved out of and into the core.

During manufacture of the absorber part it may undergo a heat treatment such that the hafnium alloy has completely or partially been transformed from α-phase to β-phase and thereafter rapidly cooled to α-phase.

BRIEF DESCRIPTION OF THE DRAWINGS

FIGS. 5a–5f show alternative embodiments of an attachment between two hafnium sheets.

FIGS. 6 to 10a–d show alternative embodiments of a control rod according to the invention. FIGS. 9a and 9b show a section corresponding to C—C in FIG. 8.

FIGS. 13 and 14a and b show alternative embodiments of the attachment between the absorber part and the bottom piece.

FIG. 14b show a section corresponding to E—E in FIG. 14a.

DESCRIPTION OF THE PREFERRED EMBODIMENTS

Figure 1:
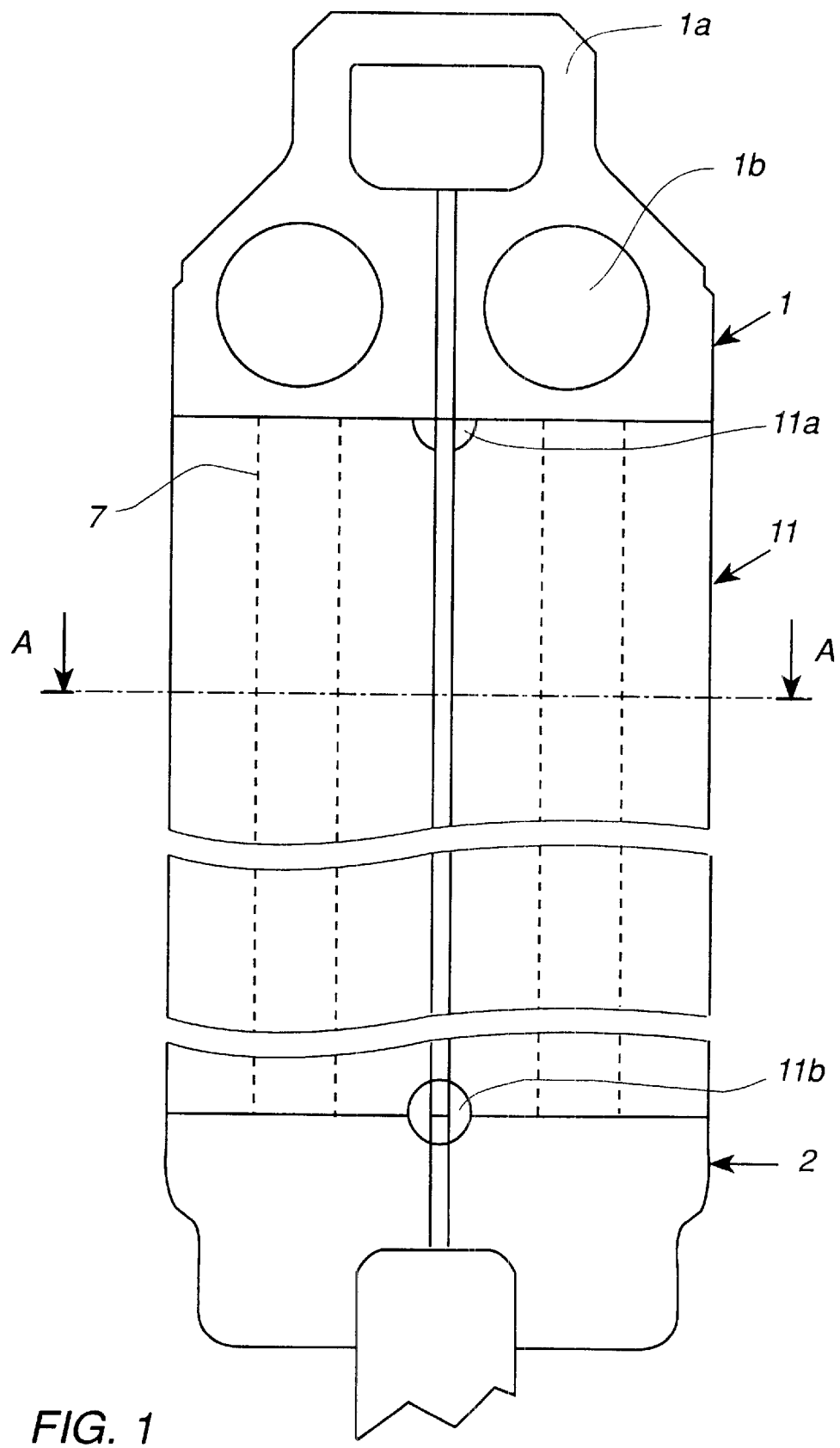
FIG. 1 schematically shows an embodiment of a control rod according to the invention.
Figure 2:
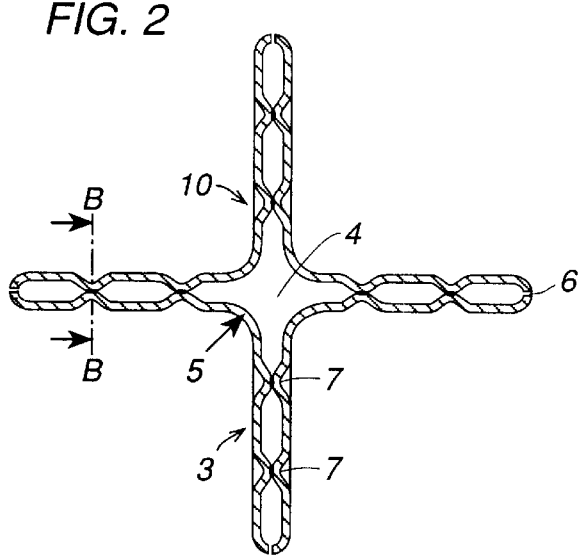
FIG. 2 shows the same control rod in a section corresponding to A—A in FIG. 1.

FIGS. 1 and 2 show a preferred embodiment of a control rod according to the invention. The control rod comprises a top piece 1 and a bottom piece 2 for fixing an absorber part 11 extending therebetween. The top piece comprises a handle 1a and distance buttons 1b, which ensure that the control rod, when being inserted into the reactor core, is kept at a definite distance from the fuel. The absorber part comprises a central part 4 and four absorber blades 3 extending from the central part. The central part and the absorber blades together form a cruciform channel 10. The absorber part comprises four plates 5 of thin hafnium sheet with a substantially L-shaped cross section in the longitudinal direction of the control rod, that is, a plate which is bent through 90° such that each side of the bending line is equally long. The plates are arranged facing each other so as to form a right-angled cross with four absorber blades 3.

Figure 3:
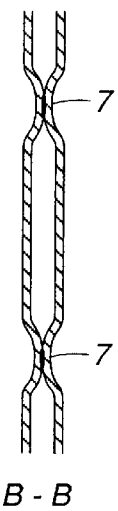
FIG. 3 shows how the channel walls are joined together in a section corresponding to B—B in FIG. 2.

For joining the walls of the channel together and keeping them at a distance from each other in the absorber blades, each one of the opposite walls is provided with indentations 7 intermittently arranged in the longitudinal direction. Each indentation in one wall is directed against and welded to a corresponding indentation belonging to the other wall. In this way, the walls of the channel are joined together intermittently along the length of the whole channel. FIG. 3 shows in detail the appearance of the joined indentations in a section B—B in FIG. 2. The control rod is provided with two rows of indentations in each absorber blade.

The plates are not joined together along the outer edge of the absorber blades. An opening 6 has been left between the plates, which gives a good exchange of water between the inside and outside of the control rod. The opening 6 extends along the length of the whole absorber part. The water in the control rod causes a slowing down of the fast neutrons such that they can be more easily absorbed by the hafnium sheet. During the slowing down, heat is released. Neutron absorption in the hafnium sheets and the radiation absorption also contribute to a significant heat generation in the control rod. For the control rod to function satisfactorily, it must have thorough cooling. The water used as moderator also serves as coolant in the control rod. The openings 6 in the outer ends of the absorber blades provide a flow of cooling water and, in addition, eliminate the risk of pressure increase in the control rod. Steam formation in the control rod would also be a safety hazard as it would reduce the effectiveness of the control rod.

The cruciform channel formed from the joined L-shaped plates is open at both top and bottom such that the cooling water which flows upwards through the core can pass through the control rod. The top piece and the bottom piece are fixed to the absorber part by rivets. Openings 11a are arranged between the absorber part and the top piece. Between the absorber part and the bottom part, openings 11b are arranged. The task of these openings is to improve the flow of water through the absorber part. The openings shall be of such a size to create a thorough circulation of the cooling water.

Figure 4:
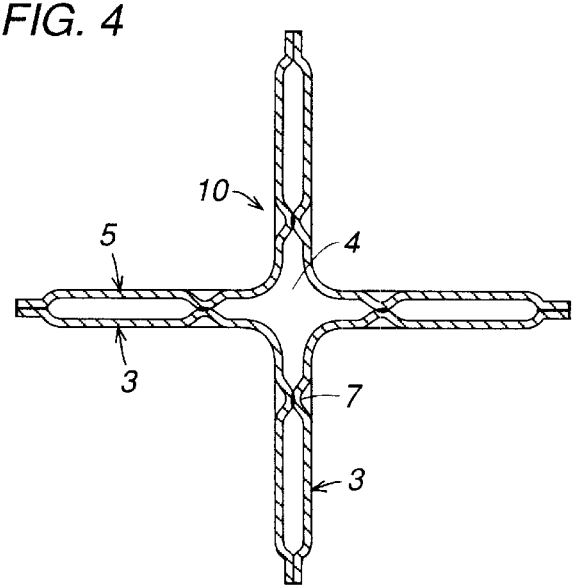
FIG. 4 shows an alternative embodiment of a control rod according to the invention.

In an embodiment of a control rod according to the invention shown in FIG. 4, the control rod only has one row of indentations in each absorber blade, and instead the outer ends of the absorber blades are joined together. The joining of the plates in the outer ends of the absorber blades can be made by means of, for example, spot welding or rivets. An all-welded edge is unsuitable since stresses are thus built into the control rod. In further embodiments the outer end of the absorber blade may be partially open and partially joined together.

Instead of using indentations as spacers, an inwardly facing fold may be arranged on each wall in the longitudinal direction thereof. Two opposite side walls are joined by means of, for example, spot welding along the folds. The folds divide the large cruciform channel into five smaller channels, which consist of a central cruciform channel and four channels located in the absorber blades.

FIGS. 5a–5f show different possible attachments between two hafnium sheets. FIG. 5a shows a spot weld and FIG. 5b shows a fusion weld, for example a TIG weld. Welding has the advantage that it does not add any small parts to the construction which may subsequently loosen and cause problems. A disadvantage with welding is that it requires expensive and complicated welding equipment. FIG. 5c shows a conventional rivet joint, and FIG. 5d shows a rivet joint with a safety device which prevents the whole rivet from loosening if the rivet breaks. FIG. 5e shows a two-part rivet joint which is welded or threaded and weld-locked. FIG. 5f shows an upset rivet joint where the plates are pressed together in such a way as to lock against each other. Rivets may be of a material other than hafnium, for example titanium, zirconium, stainless steel or Inconel (nickel-base alloy). The advantage of a rivet joint is that it is simple and inexpensive to manufacture. The disadvantage is that it comprises a large number of small rivets which may possibly loosen after some time in operation.

Figure 6:
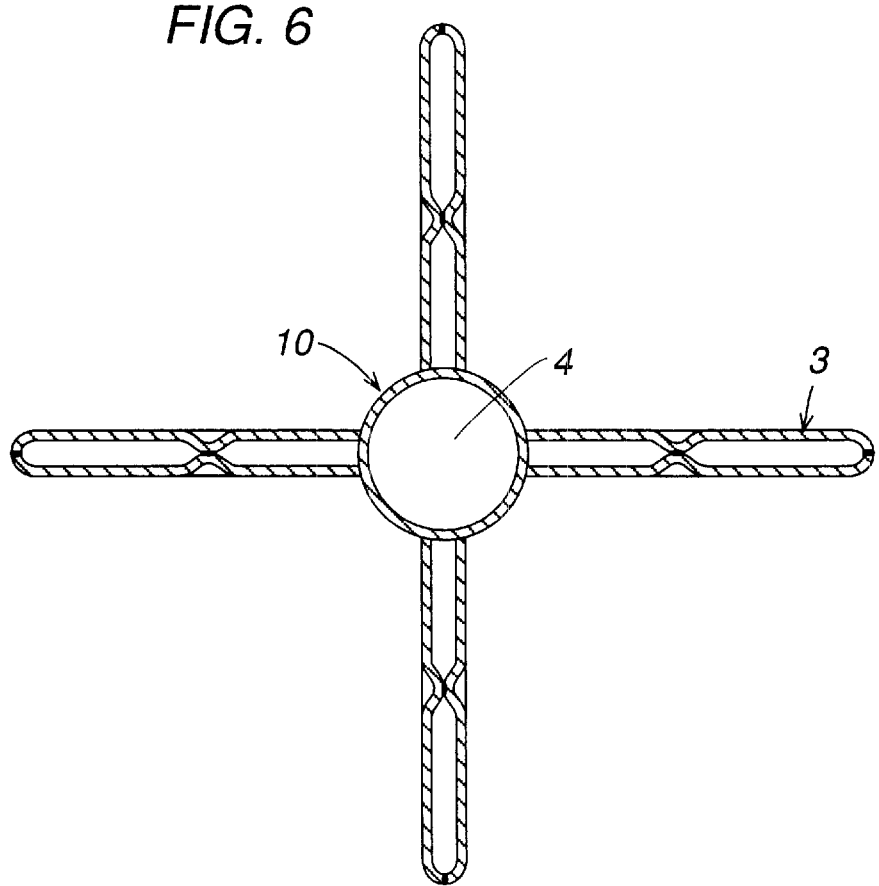

FIG. 6 shows a further embodiment of the invention, which comprises a tube of hafnium on which are arranged four absorber blades 3 of hafnium sheet. The hafnium tube constitutes a centrally located channel 10. The channel has a substantially circular cross section and is at least partially filled with a moderator. Each absorber blade constitutes a channel which is at least partially filled with a moderator.

The neutron irradiation of the control rod does not take place uniformly across the whole surface; for example, an outer portion of the absorber blades is exposed to a higher irradiation than other portions. The upper part of the control rod, that is, that part which is nearest the top piece, is also exposed to a higher irradiation than the lower part, that is, that part which is nearest the bottom piece. Those parts of the neutron absorber which are exposed to a higher irradiation are burnt out faster than the remainder of the control rod. To obtain an optimum hafnium use, the thickness of the sheet should vary, that is, thicker sheets in those parts which are burnt out fastest. However, the strength of the control rod must also be taken into consideration.

Figure 7:
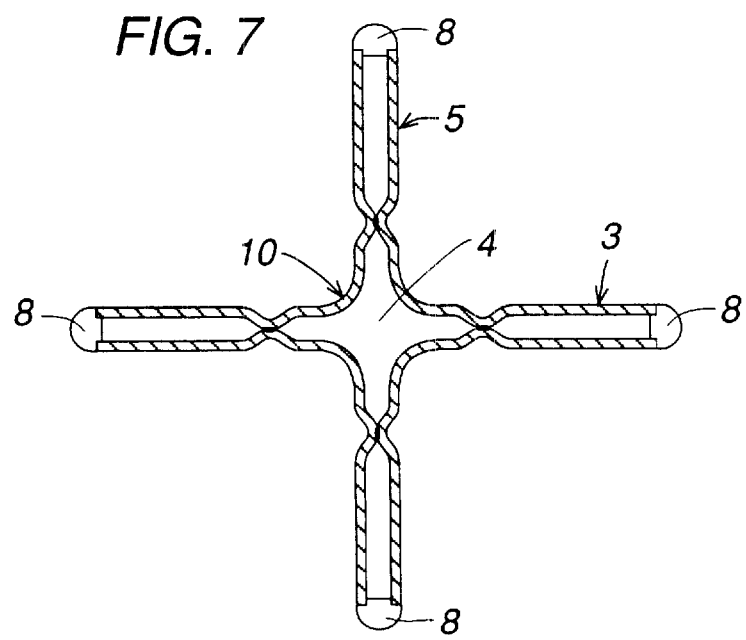
Figure 10A:
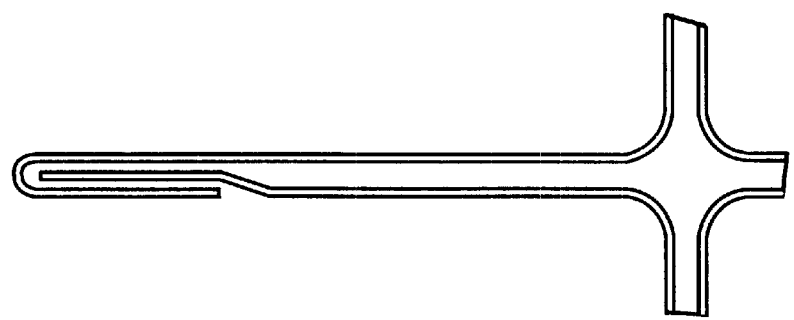
Figure 10B:
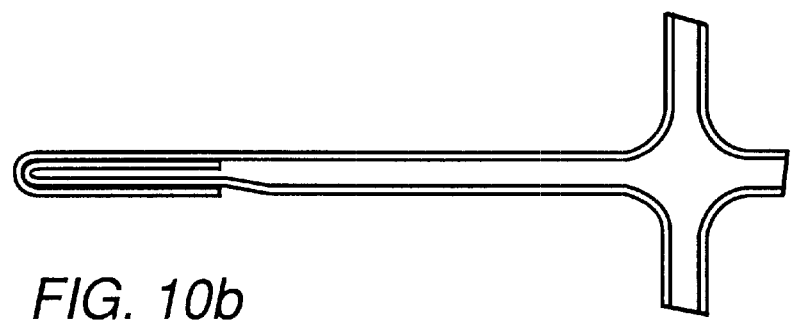
Figure 10C:
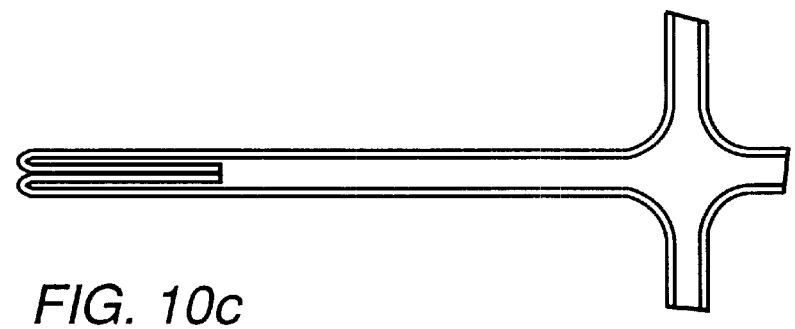
Figure 10D:
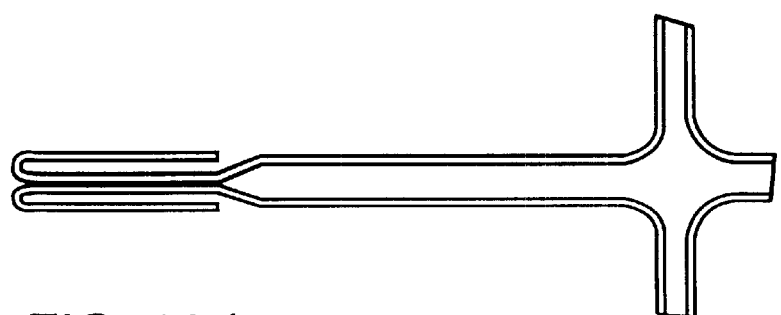

In an alternative embodiment of the invention, a bar of neutron-absorbing material, for example hafnium, is arranged at the extreme end of each absorber blade in order to increase the amount of neutron-absorbing material at particularly exposed points. This bar may also serve as a base for attachment of the bottom piece and the top piece. FIG. 7 shows a section through a control rod according to the invention with a bar 8 inserted between two adjacent plates 5 which together, with the bar, form a control rod blade.

It is desirable to be able to vary the absorption capacity, that is, the amount of hafnium, both axially and radially in the absorber part. FIG. 8 shows a control rod according to the invention where the amount of hafnium varies both axially and radially in the absorber part. In the regions marked 20, the hafnium thickness is greater than in the other parts of the absorber part. One way of achieving the desired variation in the absorption capacity is to vary the sheet thickness in the absorber part. FIG. 9a shows in a section C—C in FIG. 8 how the sheet thickness varies radially in an absorber blade. The disadvantages of this method are the higher manufacturing costs.

FIG. 9b shows in a section C—C in FIG. 8 another method of varying the absorption capacity, which means that a hafnium sheet 21 is suspended loosely in the control rod blade. The hafnium sheet may be varied in length, width and thickness and may be provided with different holes and recesses. The attachment of the hafnium sheet may be made in connection with the attachment of the absorber blade to the top piece. To prevent the hafnium sheet from possibly becoming detached from the top piece, it may be secured with the aid of the intermittently arranged indentations which keep the control rod blade together. These indentations are not shown in FIGS. 9a and 9b.

One further way of varying the absorption capacity axially and radially in the control rod, which is shown in FIGS. 10a–10d, is to bend back one or both of the edges of the hafnium plates inwards toward the central part of the absorber part.

Figure 11A:
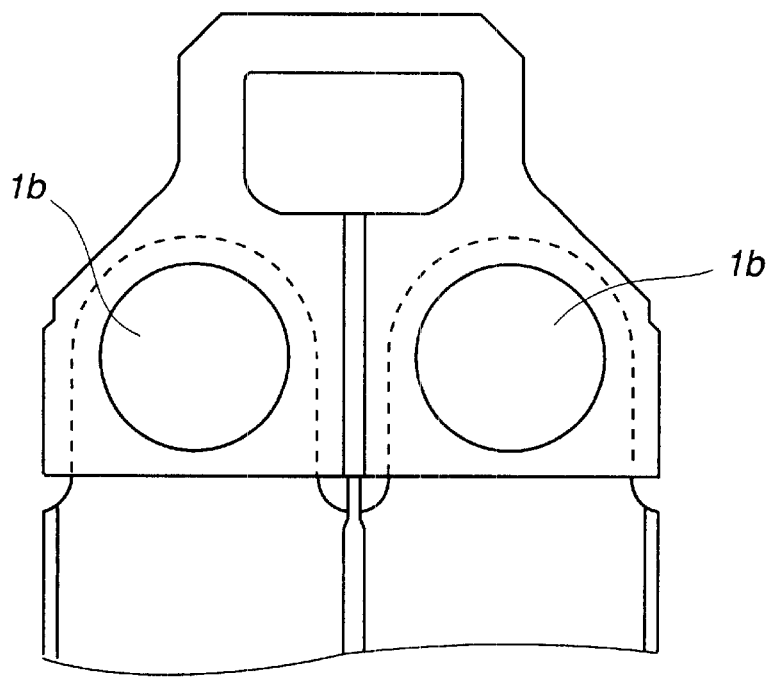
FIGS. 11a and 11b show alternative embodiments of an attachment between the absorber part and the top piece.
Figure 11B:
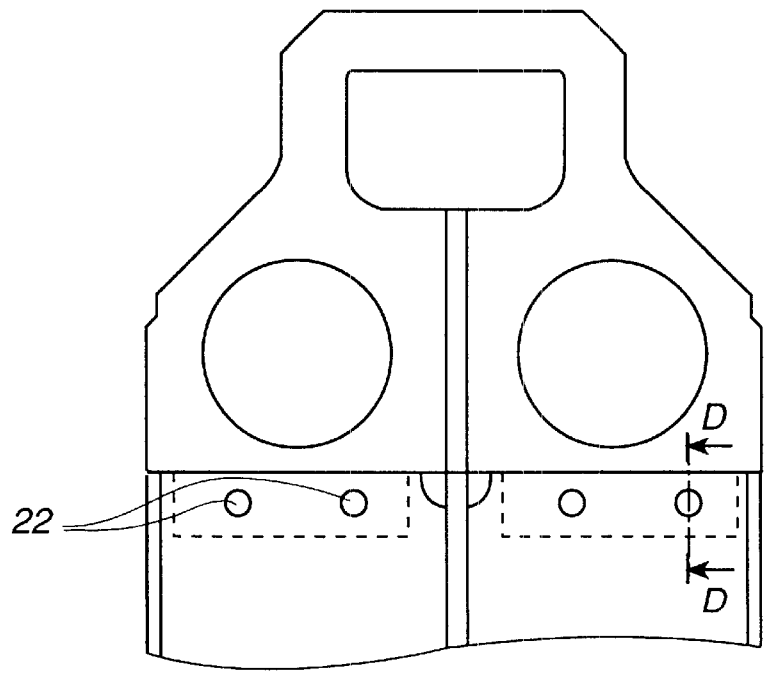

Since the absorber part is of hafnium and the top piece and the bottom piece are of stainless steel, they cannot be welded to each other, which would be the case if they were of the same material. In the following, a few proposals for possible attachments will be given. In the event of reactor scram (fast insertion of the control rods), the stress is great on the attachment between the absorber part and the bottom piece. The attachment between the absorber part and the top piece, on the other hand, is exposed to lower stress and can therefore be made in combination with the distance buttons 1b (see FIG. 11a). This gives the distance buttons a twofold function, namely, as spacers between the control rod and the fuel, and as a large rivet for attachment between the absorber part and the top piece. As an alternative to using the distance button as attachment between the absorber part and the top piece, a rivet joint can be used (see FIG. 11b).

Figure 12A:
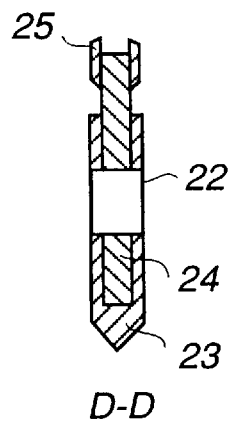
FIGS. 12a–12c show in a section corresponding to D—D in FIG. 11b different alternatives of the construction of an attachment by means of a rivet joint.
Figure 12B:
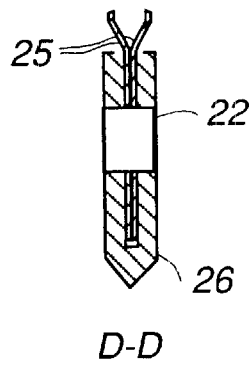
Figure 12C:
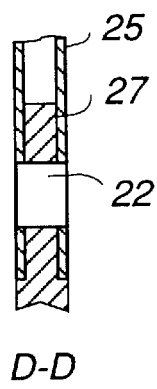

The attachment with rivets 22 can be made in a plurality of different ways. FIGS. 12a–12c show different alternatives. FIG. 12a shows how the stainless part 23 surrounds one end of a tray 24 of hafnium and the other end of the tray is inserted between the hafnium sheets 25 in the absorber blades. The hafnium tray is welded to the hafnium sheets in the absorber blades. The stainless part and the hafnium tray are welded together by means of one or more rivets 22. In FIG. 12b, the lower parts of the hafnium sheets 25 in the absorber blades are compressed to make contact with each other and surrounded by the stainless part 26. The stainless part 26 and the hafnium sheets 25 are joined together by means of one or more rivets 22. In FIG. 12c, one end of the stainless part is formed as a lug 27. The lug is inserted between the hafnium sheets 25 in the absorber blades and is fixed by one or more rivets 22.

Figure 13:
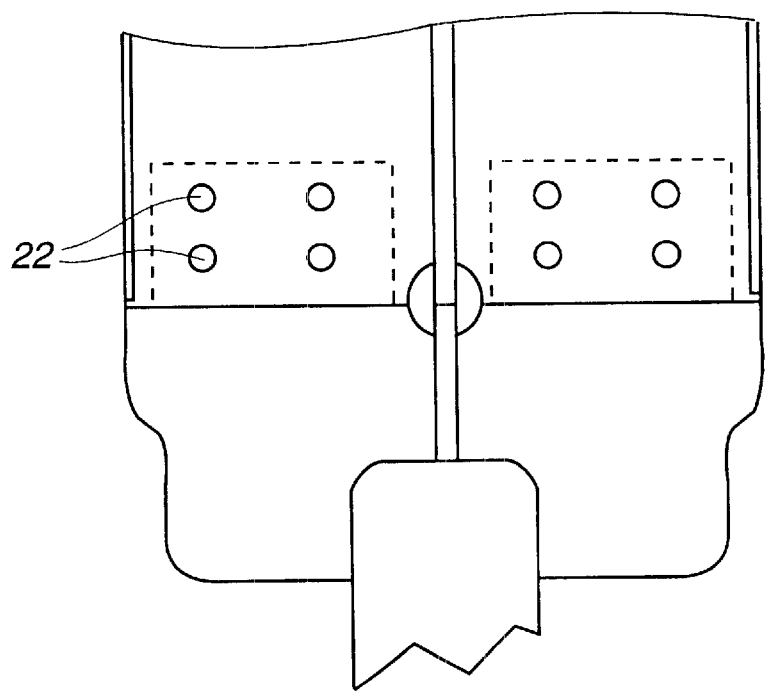

FIG. 13 shows a rivet joint between the absorber part and the bottom piece. The attachment can be made using any of the alternatives shown in FIGS. 12a–12c. The advantage of a rivet joint is that it has a low weight and is simple to mount. A disadvantage of a rivet joint is that it contains many small parts which may possibly loosen during operation. An alternative to rivet joints is a locking-pin joint, which is shown in FIGS. 14a and 14b. The absorber part terminates in a lug 28 of hafnium which is locked in the bottom part by means of a pin 29. FIG. 14b shows in a section E—E how the hafnium lug is inserted into and welded between the hafnium sheets in the absorber part. A disadvantage of a locking-pin joint is, among other things, that the control rod becomes heavy because of the considerable weight of the hafnium lug. A large quantity of hafnium in the lower part of the control rod results in an inefficient use of hafnium, since the major burnup takes place in the upper part of the control rod.

The absorber material in a control rod according to the invention may, for example, consist of pure hafnium or of some hafnium alloy, for example a hafnium-zirconium alloy. Another common absorber alloy is an alloy of cadmium, indium and silver, usually with a composition such that the nuclear properties of hafnium are imitated. The moderator consists of water or a solid moderator, for example zirconium hydride.

During the manufacture of a hafnium sheet, it is given a directed texture. Upon neutron irradiation of the sheet, an irradiation growth takes place, substantially in the direction of the texture. A control rod made of hafnium sheet, as the one described above, thus runs the risk of being bent when subjected to neutron irradiation. One way of preventing this bending is to β-quench the hafnium sheet in a manner analogous to that of a zirconium alloy. Such a method is described, for example, in Swedish patent specification 7502865-4. The method comprises heating the hafnium sheet up to such a high temperature that its texture is transformed from α-phase to β-phase, which has a random texture. To maintain the crystal structure in the hafnium sheet, it must be rapidly cooled again. In a random texture, the growth upon irradiation takes place equally in all directions and hence bending of the control rod is prevented.

For hafnium the transformation temperature to β-phase lies at about 1800° C. The transformation temperature for a zirconium alloy lies at about 900° C. By alloying hafnium with some suitable metal, for example Fe, Ni, Cr, Nb, the transformation temperature may be reduced to a transformation temperature which lies near the transformation temperature of the zirconium alloy. When choosing a suitable alloy, it is important to ensure that the corrosion properties and hydrogen pick-up properties of hafnium are retained and preferably improved. After the β-quenching it is suitable to heat-treat the hafnium sheet to relieve stresses in the sheet caused by the β-quenching, so-called stress-relieve annealing.

What is claimed is:

1. A control rod for a boiling water reactor which control rod is submerged under water during operation, said control rod comprising:

a top piece;

a bottom piece; and an absorber part fixed between said top piece and said bottom piece, said absorber part including neutron absorbing metal sheets arranged opposite each other forming a cruciform cross-section comprising a central part and four wing parts;

a plurality of indentations being distributed intermittently in the longitudinal direction on each said metal sheet, a connection being formed between corresponding indentations on opposite metal sheets in order to space said metal sheets apart; and said central part and said wing parts being hollow and containing no other support structure or neutron absorbing material except for said connections, said central part and said wing parts extending between said top piece and said bottom piece and being open at least at their top and bottom so as to fill the interior of said absorber part with water when submerged whereby a water volume is surrounded by said metal sheets.

2. A control rod for a boiling water reactor which control rod is submerged under water during operation, said control rod comprising:

a top piece;

a bottom piece; and an absorber part fixed between said top piece and said bottom piece, said absorber part including neutron absorbing metal sheets arranged opposite each other forming a cruciform cross-section comprising a central part and four wing parts;

said central part and said wing parts being hollow and containing no other support structure or neutron absorbing material, said central part and said wing parts extending between said top piece and said bottom piece and being open at least at their top and bottom so as to fill the interior of said absorber part with water when submerged whereby a water volume is surrounded by said metal sheets.

3. A control rod according to claim 1, wherein said neutron-absorbing material in the absorber part comprises hafnium.

4. A control rod according to claim 2, wherein said neutron-absorbing material in the absorber part comprises hafnium.

5. A control rod according to claim 1 wherein said metal sheets are L-shaped metal sheets.

6. A control rod according to claim 2 wherein said metal sheets are L-shaped metal sheets.

7. A control rod according to claim 1, wherein the thickness of the metal sheets varies.

8. A control rod according to claim 2, wherein the thickness of the metal sheets varies.

\* \* \* \* \*